United States Patent
Laudato et al.

(10) Patent No.: US 8,175,940 B2
(45) Date of Patent: May 8, 2012

(54) METHOD AND SYSTEM FOR ADMINISTERING A VARIABLE UNIVERSAL LIFE INSURANCE PRODUCT HAVING A VOLATILITY REDUCTION FEATURE

(75) Inventors: Anthony C. Laudato, Westfield, MA (US); Douglas K. Noble, Avon, CT (US)

(73) Assignee: Lincoln National Life Insurance Company, Fort Wayne, IN (US)

( * ) Notice: Subject to any disclaimer, the term of this patent is extended or adjusted under 35 U.S.C. 154(b) by 708 days.

(21) Appl. No.: 11/695,742

(22) Filed: Apr. 3, 2007

(65) Prior Publication Data

US 2008/0249810 A1    Oct. 9, 2008

(51) Int. Cl.
    *G06Q 40/00*    (2012.01)
(52) U.S. Cl. .................................................. 705/35
(58) Field of Classification Search ............... 705/35
    See application file for complete search history.

(56) References Cited

U.S. PATENT DOCUMENTS

| | | | |
|---|---|---|---|
| 5,712,985 A * | 1/1998 | Lee et al. ......................... | 705/7 |
| 5,926,792 A | 7/1999 | Koppes et al. | |
| 2002/0032624 A1 * | 3/2002 | Yang et al. ...................... | 705/30 |
| 2002/0174081 A1 * | 11/2002 | Charbonneau et al. ......... | 706/15 |
| 2002/0188540 A1 * | 12/2002 | Fay et al. ......................... | 705/36 |
| 2002/0194098 A1 * | 12/2002 | Stiff et al. ........................ | 705/36 |
| 2002/0198802 A1 * | 12/2002 | Koresko, V ..................... | 705/35 |
| 2003/0177077 A1 * | 9/2003 | Norman .......................... | 705/35 |
| 2004/0088236 A1 * | 5/2004 | Manning ......................... | 705/35 |
| 2004/0117202 A1 * | 6/2004 | Winklevoss et al. ............ | 705/1 |
| 2004/0215493 A1 * | 10/2004 | Koppes et al. ................... | 705/4 |
| 2005/0015284 A1 * | 1/2005 | Macdonald ...................... | 705/4 |
| 2005/0086085 A1 * | 4/2005 | Berlin et al. .................... | 705/4 |
| 2007/0244780 A1 * | 10/2007 | Liu .................................. | 705/35 |

* cited by examiner

*Primary Examiner* — Jason Dunham
*Assistant Examiner* — Leland Marcus
(74) *Attorney, Agent, or Firm* — Barnes & Thornburg LLP

(57) ABSTRACT

A method and system of administering a financial product having a volatility reduction feature comprises providing a life insurance policy having a cash surrender value, creating at least one subaccount associated with the policy, storing a number of accumulation units associated with the subaccount, storing a plurality of accumulation unit values, calculating an average of stored accumulation unit values and using the average to determine a target unit value. The surrender value of the subaccount is periodically determined by multiplying the number of accumulation units by the target unit value. The surrender value of the subaccount is used to periodically determine the cash surrender value of the insurance policy.

24 Claims, 4 Drawing Sheets

METHOD AND SYSTEM FOR ADMINISTERING A VARIABLE UNIVERSAL LIFE INSURANCE PRODUCT HAVING A VOLATILITY REDUCTION FEATURE

TECHNICAL FIELD

The present disclosure relates to financial products and, more particularly methods and systems for administering financial products. In one specific embodiment, the subject invention relates to methods and systems for administering a variable universal life insurance product intended for the Bank-Owned Life Insurance ("BOLI") and/or Corporate-Owned Life Insurance ("COLI") market.

BACKGROUND

BOLI (or COLI) products are used by banks (and corporations) to fund benefits of high income employees. There are substantial advantages to the use of these products to fund employee benefits, including substantial tax benefits for the employer. However, a disadvantage of such products is the variability and relative volatility of the policy values which must be reported on balance sheets of the banks (or corporations) owning the products. Over the long term, the returns on these products may be expected to be relatively high. However, in a short term, annual returns may be either positive or negative, sometimes causing substantial variability in the overall value of an employer's insurance portfolio from year to year.

This volatility problem has been addressed in the prior art by the use of Stable Value "wrap" contracts. A Stable Value investment has been defined as "[a] unique asset class offering defined contribution plan participants intermediate term returns and liquidity (subject to plan rules) without market value risk or other penalty. This is typically accomplished through a wrap contract or investment contract that guarantees the payment of plan-related benefits at book value (cost plus accrued interest) which enables the entire investment to be carried at its book value." (Source: Stable Value Investment Association, www.stablevalue.org/glossary). The wrap contracts referred to in this definition may be used to smooth the volatility inherent in BOLI and COLI products. One example of such use in connection with COLI products is described in U.S. Pat. No. 5,926,792.

Use of a Stable Value wrap contract can virtually eliminate volatility of a protected investment account (or subaccount). However, this approach can be relatively expensive and cumbersome to employ and administer. Moreover, the degree of volatility reduction achieved with this approach may be more than is needed in certain instances.

There exists a need for an alternative "smoothing" mechanism which can be used to reduce the volatility associated with financial products, such as BOLI and COLI products. Described herein is such an alternative.

SUMMARY OF THE INVENTION

In one embodiment, the subject invention is a method of administering a variable universal life insurance product having a volatility reduction feature. This embodiment comprises the steps of providing a life insurance policy having a cash surrender value, and creating a plurality of variable subaccounts associated with the policy. At least one of the subaccounts is an unsmoothed variable subaccount, while at least one other of the subaccounts is a smoothed variable subaccount. An account value for each unsmoothed variable subaccount is periodically calculated by storing a number of variable accumulation units associated with the subaccount, storing a variable accumulation unit value, and periodically determining the account value of the subaccount by multiplying the number of variable accumulation units by the variable accumulation unit value. A surrender value for each smoothed variable subaccount is periodically calculated by storing a number of variable accumulation units associated with the subaccount, storing a plurality of variable accumulation unit values, calculating an average of stored variable accumulation unit values and using the average to determine a target unit value. The surrender value of the subaccount is periodically determined by multiplying the number of variable accumulation units by the target unit value. The account value of the unsmoothed variable subaccount and the surrender value of the smoothed variable subaccount are periodically used to determine the cash surrender value of the insurance policy.

In this and other embodiments, the target unit value for the smoothed variable subaccount is determined in an initial policy period by multiplying a previously determined target unit value by a rate factor (e.g., an initial crediting rate). Such factor is typically determined by the insurer. In one embodiment, the rate factor is based on a projected annual return for the subaccount, and the initial policy period is one year.

In this and other embodiments, the target unit value of the smoothed variable subaccount is determined in a policy period subsequent to an initial policy period by taking the greater of the target unit value for a previous period multiplied by a first rate factor, and the average of previously stored variable accumulation unit values multiplied by a second rate factor. In one embodiment, the first rate factor provides a minimum rate of increase of the target unit value, and the second rate factor is a moving average adjustment rate. In this and other embodiments, the previously stored variable accumulation unit values that are averaged comprise unit values determined on a periodic (e.g., monthly) basis for a defined period (e.g., one year).

In this and other embodiments, the target unit value for the smoothed variable subaccount is determined in a policy period subsequent to the initial policy period, for any day between a specified day in a previous period and a specified day in a current period, by multiplying the target unit value determined for the specified day in the previous period by the target unit value determined for the specified day in the current period divided by the target unit value determined for the specified date in the previous period raised to an exponent X. The exponent X is equal to the number of days since the specified day in the previous period divided by the number of days between the specified day in the previous period and the specified day in the current period.

Stated alternatively, the target unit value in the method of the above-referenced embodiment (and other embodiments) may be determined as follows:

a. for any valuation day in an initial policy period, by multiplying the target unit value determined on a previous day by a rate factor;

b. for a specified day in a current month of a policy period after the initial policy period, by taking the greater of a target unit value determined for a specified day of a previous month multiplied by a rate factor, and the average of previously stored variable accumulation unit values multiplied by a rate factor; and c. for any day between the specified day in the previous month and the specified day in the current month of a policy period after the initial policy period, by multiplying the target unit value determined for the specified day of the previous month by the target unit value determined for the specified day of the current month divided by the target unit value determined for the specified day of the previous month raised to the exponent X, where X is equal to the number of days since the specified day in the previous period divided by the number of days between the specified day in the previous period and the specified day in the current period.

In one embodiment of the subject method, the step of creating a plurality of subaccounts further comprises creating at least one non-variable (i.e., fixed) subaccount. Such embodiment includes the further steps of periodically determining an account value of the non-variable subaccount, and using the account value in the step of periodically determining the cash surrender value of the insurance policy. This and/or other embodiments may further comprise the step of providing a loan feature to an owner of the life insurance policy. If provided, the step of periodically determining the cash surrender value of the insurance policy includes accounting for indebtedness under the loan feature.

Another embodiment of the invention comprises a method of administering a variable universal life insurance product having a volatility reduction feature, comprising the steps of: providing a life insurance policy having a cash surrender value; creating at least one subaccount associated with the life insurance policy; storing a number of variable accumulation units associated with the subaccount; storing a plurality of variable accumulation unit values associated with the subaccount; calculating an average of stored variable accumulation unit values, and using the average to determine a target unit value; periodically determining a surrender value of the subaccount by multiplying the number of variable accumulation units by the target unit value; and using the surrender value of the subaccount, periodically determining the cash surrender value of the insurance policy. In such embodiment, the target unit value may further be determined as described above and below.

The subject invention further includes administration systems for implementing the embodiments of the methods referenced above. One embodiment of such a system is described in detail below in connection with FIG. 1.

The volatility reduction feature of the present invention may be used in connection with other financial products. One such financial product comprises a plurality of investment funds, and a smoothed cash value. Steps of the method further comprise storing a number of accumulation units associated with each of the investment funds, and storing a number of accumulation units and accumulation unit values associated with each investment fund, calculating an account value of the product by summing across the funds, establishing an initial product unit value, determining an initial number of product units by dividing the account value of the product by the product unit value; and periodically determining a subsequent product unit value by multiplying the previous product unit value by one plus the growth rate in the account value. A smoothed unit value is periodically determined by calculating a moving average of the product unit value in one or more previously determined product unit values. A smoothed cash value of the product is periodically determined by multiplying the number of product units by the smoothed unit value.

Additional features and advantages will become apparent to those skilled in the art upon consideration of the following detailed description of the preferred embodiments exemplifying the best mode of carrying out the system and method, as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein is intended to be illustrative, and such exemplification is not to be construed as limiting the scope of the claims in any manner.

DETAILED DESCRIPTION OF THE DRAWINGS

Before discussing the preferred embodiments of the invention, which are described and illustrated in connection with FIGS. 1-4, it should be noted that, although the invention will be discussed in terms of its particular applicability to life insurance products in the BOLI and COLI market, the broader aspects of the invention are not necessarily limited to this particular application. Although the preferred embodiments described below do offer particular product advantages in that market, adaptation and application of the invention to other markets or financial products may also be advantageous. Accordingly, the scope of the invention is not intended to be limited by the details of the embodiments discussed below, but rather by the terms of the claims following this detailed description.

Figure 1:
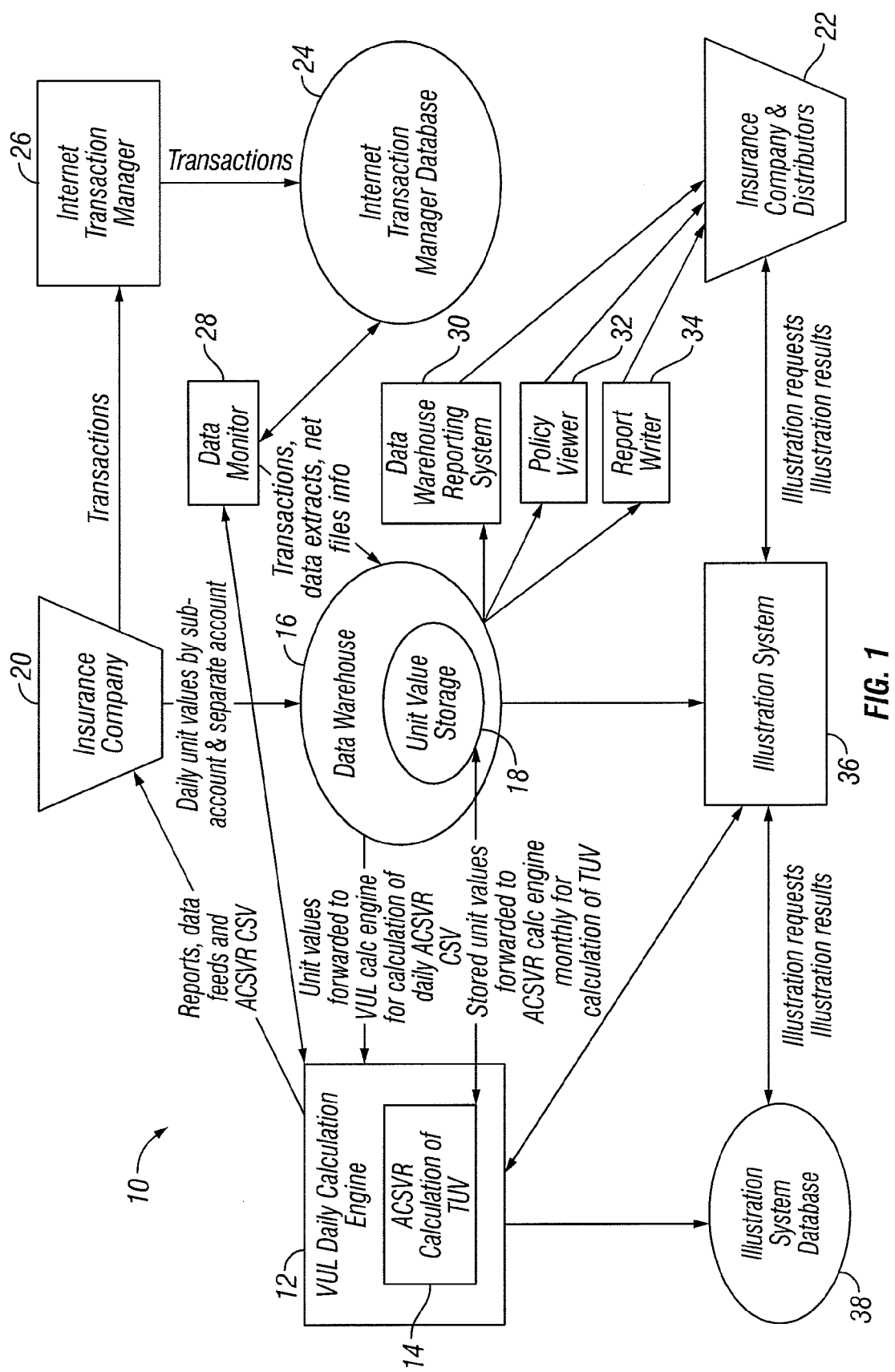
FIG. 1 shows a block diagram of one embodiment of a generalized computing system constructed in accordance with the principles of the present invention.

It should also be noted that the system of the present invention, illustratively illustrated in the block diagram of FIG. 1, can be implemented with readily available computing and data processing hardware. Such hardware may include a central processing unit, one or more input devices, one or more output devices, a memory unit and one or more networks of the type typically used in the financial products industry. Although specialized hardware could be specifically constructed and dedicated to implementation of the invention, such hardware is not necessary to practice the invention, and the claims which follow this description should in no way be so limited.

With reference to FIG. 1, there is shown a block diagram of a generalized data processing system suitable for use in practicing the present invention. System 10 includes a VUL (Variable Universal Life) daily calculation engine 12 which is capable of performing calculations necessary to the administration of VUL products. Within engine 12, as illustrated by block 14, are algorithms for calculating values necessary to administer an Alternative Cash Surrender Value Rider (ACSVR) which embodies principles of the present invention. Such values include a Target Unit Value (TUV). The particular formulas for calculating such values in the context of the preferred embodiments described herein are set forth below.

In additional to calculation engine 12, system 10 includes data storage represented in FIG. 1 by data warehouse 16. Data warehouse 16 stores quantities used by calculation engine 12, as well as results of the calculations performed by engine 12. Data warehouse 16 includes storage capacity for the unit values used and calculated by portion 14 of calculation engine 12. Such storage is illustratively represented in FIG. 1 by element 18.

An insurer, illustratively represented by elements 20 and 22 in FIG. 1, receive reports and data from, and provides data to, calculation engine 12 and/or data warehouse 16. The insurer so represented may be a traditional insurance company, or another entity authorized to provide products of the type described herein. The insurer may have a customer or broker accessible interface on a computer network (such as a web interface on the worldwide web) used to receive life insurance applications, or data relating thereto. Such an interface is generally illustrated in the embodiment of FIG. 1 by elements 24 and 26. Data received by such interface are made available to calculation engine 12 and data warehouse 16 by appropriately constructed network connections, illustratively represented in FIG. 1 by data monitor 28.

Also illustrated in FIG. 1 are reporting system 30, policy viewer 32 and report writer 34, all of which receive information from data warehouse 16 for the purpose of generating and/or writing reports for the insurer and its distributors (i.e., brokers). These elements further allow appropriately authorized personnel to view such reports and policies, as needed. Also illustrated in FIG. 1, and generally represented by elements 36 and 38, respectively, are an illustration system and an illustration system database. System 36 and database 38 receive data from calculation engine 12 and data warehouse 16 for the purpose of preparing illustrations relating to life insurance products sold by the insurance company and its distributors. Such illustrations are routinely used to disclose and "illustrate" the workings of particular products to prospective insureds, employers, and other appropriate parties.

Figure 2:
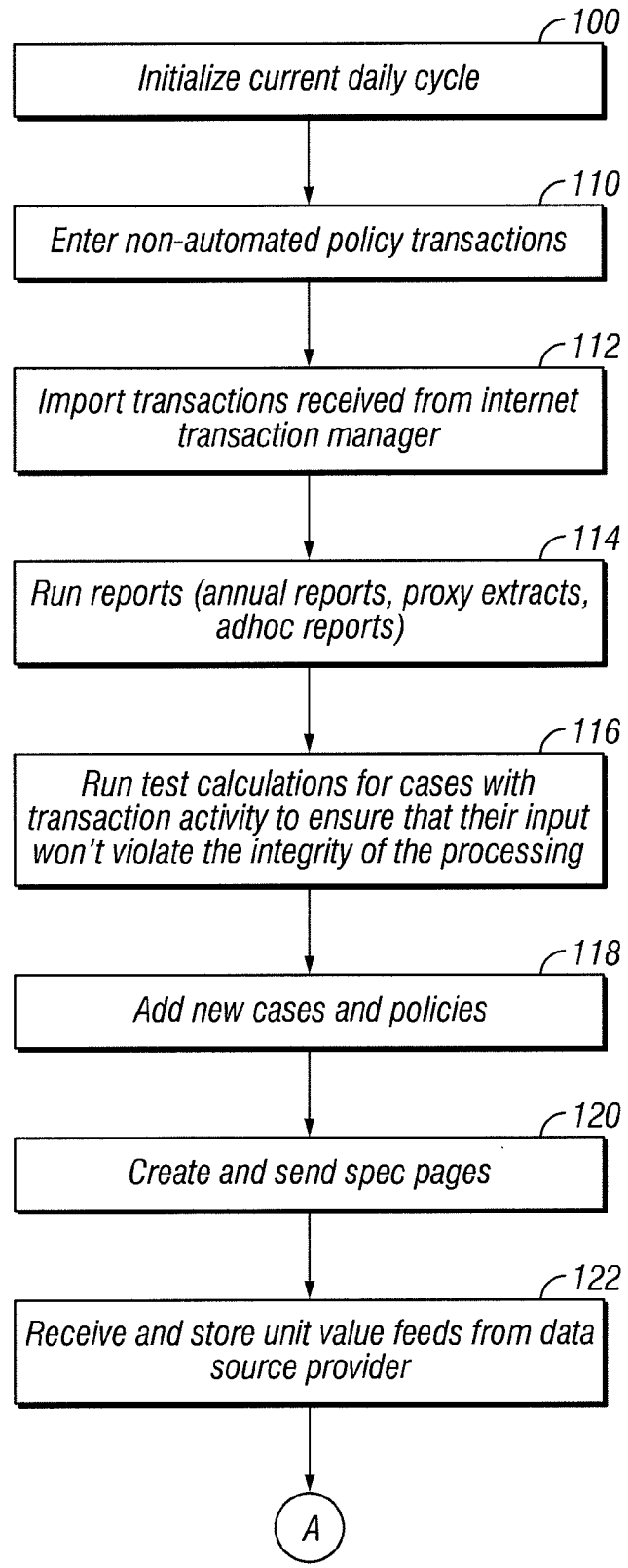
FIG. 2 shows a flow chart which illustrates a portion of an embodiment.

FIG. 2 shows a flow chart which further illustrates a portion of a preferred embodiment. With reference to FIG. 2, block 100 represents an initialization process which is performed prior to performing the remaining steps. In the illustrative embodiment described, the initialization process, as well as the other operations, are performed daily.

Following initialization, non-automated policy transactions are entered into the system. This operation is represented by block 110. Such transactions are those that might be received in paper form, by electronic means such as email, or in another manner that does not result in automatic entry of data or initiation of operations into and by system 10. Following entry (if any) of these transactions, transactions received from the Internet Transaction Manager illustrated by elements 24 and 26 of FIG. 1 are imported into system 10 via data monitor 28. Such transactions may, for example, be those received from brokers having access to the web interface of the insurance company.

Following the entry and importation operations of blocks 110 and 112, reports are run by the system in an operation represented by block 114. Such reports may include annual reports, reports requested by the insurance company, brokers, or others, proxy extracts, and other reports. With reference to FIG. 1, data for such reports are provided by data warehouse 16 to data warehouse reporting system 30 and report writer 34.

The next operation in the flow chart of FIG. 2 is illustrated by block 116. In this operation, test calculations for any cases having transaction activity in the current cycle are run to insure that the data relating to such transactions will not corrupt or otherwise cause errors in the system. An example of such an error that could occur if the underlying data is mis-entered (or is otherwise erroneous) is that the system could attempt to move funds into an account (or subaccount) which does not exist. The test calculations determine whether such problems may exist with data relating to transaction activity in the current cycle.

After test calculations are run, the subject method continues with entry of new cases and policies, as indicated by block 118. Data entered in this operation relates to new business from existing or new customers, rather than to transactions relating to existing cases. For the new cases and policies entered in the operation of block 118, the system creates and sends "spec" pages. Spec pages are included in the copies of policies forwarded to new customers. The system creates and sends spec pages to a customer service representative, for example, for forwarding to the customer, broker or appropriate party.

With reference to block 122 of FIG. 2, the system receives and stores unit values from a data source provider. With reference to the block diagram of FIG. 1, this data is provided from the insurance company (block 20) for storage in data warehouse 16. The data source provider could be another entity providing such data to system 10 on behalf of the insurance company. The unit value information provided in this step is based on the market value of the investments in a particular account or fund, as determined by an investment manager monitoring the trade activity of the investments. The unit value is the value of the investments in the fund divided by the number of units in the particular account or subaccount.

Figure 3:
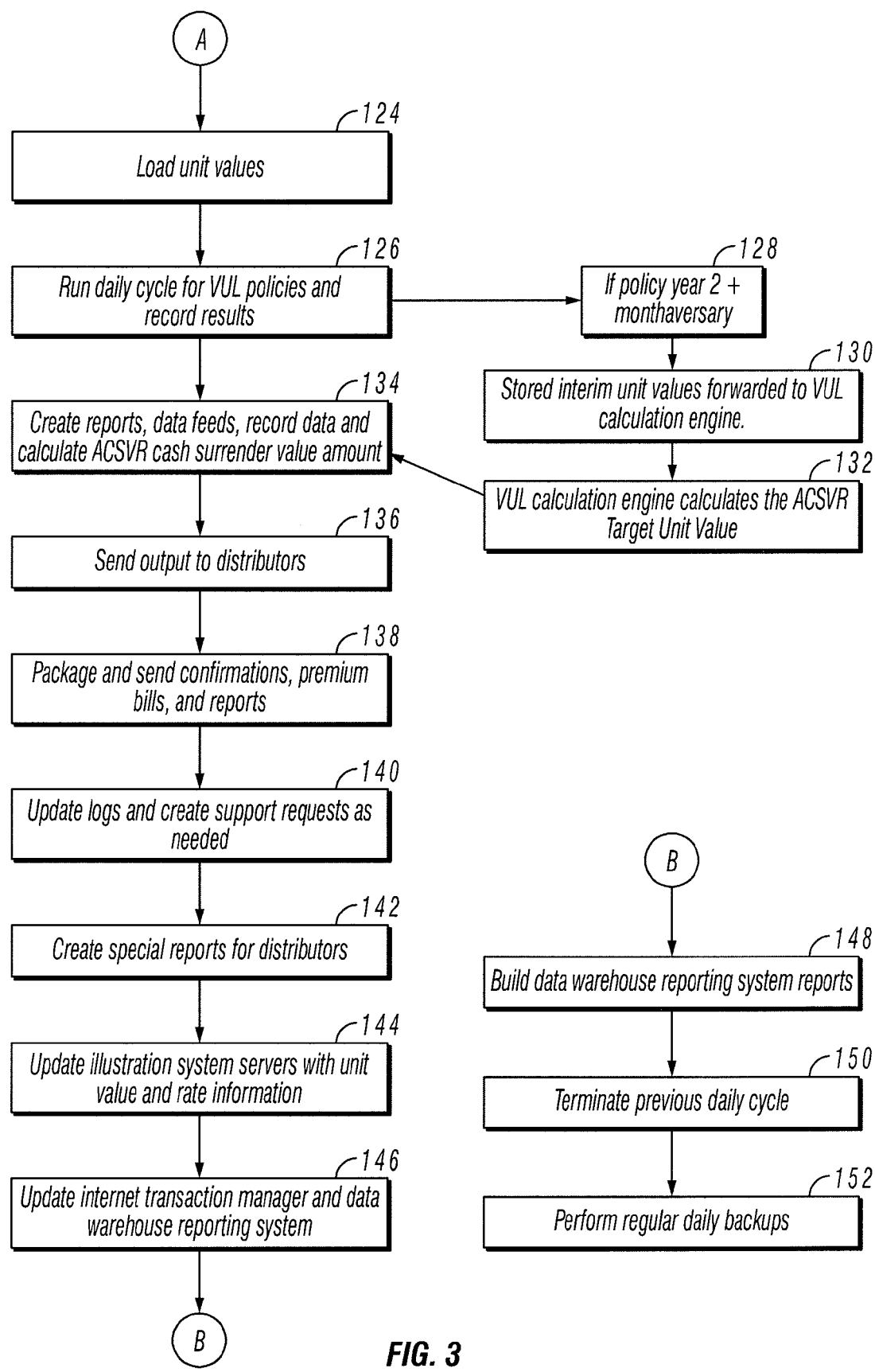
FIG. 3 shows a flow chart which illustrates the remaining portion of an embodiment of FIG. 2.

With reference to FIG. 3, the process continues as illustrated by block 124. Referring to FIG. 1, this operation represents the forwarding of unit values stored in data warehouse 16 to VUL daily calculation engine 12 for use in calculating cash surrender values, target unit values, and other quantities.

As discussed above, the preferred embodiment is particularly advantageous in the administration of a VUL product for the BOLI market. A separate account is created for each investment option, and separate subaccounts are created within each account. One or more of the subaccounts may be "unsmoothed." That is, the account value of the securities in the subaccount will be equal to the actual unit value of the securities in the subaccount multiplied by the number of units. At least one other of the subaccounts may be "smoothed" to reduce variability (or volatility) by the methodology of the present invention. For purposes of this discussion, such accounts will be termed VRR (Variability Reduction Rider) Subaccounts.

The VRR Subaccounts will have both an Account Value ("AV") and a Cash Surrender Value ("CSV"). The VRR CSV will be equal to the number of units held in the separate account multiplied by the target unit value ("TUV"). As usual, the Account Value will be determined by the number of units ("n") held in the separate account multiplied by the actual unit value ("UV"). The Total Account Value ("TAV") is determined by the following formula:

$$TAV = \sum_{i=1}^{l} n_i * UV_i + \text{Fixed account} + \text{Loan Collateral Account,}$$

where there are l variable subaccounts. Furthermore, $$VRR\ CSV = \sum_{i=1}^{k} n_i * UV_i + \sum_{j=k+1}^{l} n_j * TUV_j +$$

$$\text{Fixed Account} + \text{Loan Collateral Account,}$$

where there are l variable sub-accounts; k of them are unsmoothed, and l-k are smoothed with VRR.

The TUV in the initial period is determinable at any point in time during that period by use of the following formula (which assumes the initial period to be one year):

$$TUV(d) = UV(0) * (1 + CR)^{(d/365)},$$

Where, d is the number of days since policy inception, and CR is an initial crediting rate determined by the insurer. It is anticipated that CR will be equal to the yield-to-maturity of the investments underlying the separate account, plus or minus any anticipated spread due to security selection or leverage.

This calculation of TUV will apply to all smoothed accounts. In this illustrative embodiment, it is not anticipated that a policyholder would have more than 2 smoothed accounts at any one time. It is possible, however, that a policyholder could have both smoothed and unsmoothed accounts.

Beyond the initial period, TUVs will be determined monthly on the "monthaversary" of the policy. Month-end projected TUVs will provide the basis for the CSV at month end. The following formula is used for monthly determination of TUVs:

$$TUV(m+1)=\max(A,B)$$

where, $A=TUV(m)*1.02\hat{\ }(1/12)$;
and, $B=\text{Average}[UV(m-11), UV(m-10), \ldots, UV(m)]$.

UV(m) is the last available unit value for the sub-account in question. UV(m−1) is the previous month's UV on that same day. For example, if a policy's anniversary is January 15, then UV(m) is the January 14 unit value, and UV(m−1) is the December 14 unit value. If there is no unit value available (e.g., December 14 is a Saturday) then the next available UV will be used (in this instance, the UV for December 16).

Again, it is noted that the CSV under the VRR is determined by multiplying the number of units used to calculate the account value by the TUV. In the calculation of the CSV there is no explicit calculation of charges; they are implicit in the unit count.

TUV's between monthaversaries in month m+1 are determined by the following formula:

$$TUV(d)=TUV(m)*[TUV(m+1)/TUV(m)]\hat{\ }(d/z)$$

where, d is the number of days since the last monthaversary, and z is the number of days between monthaversaries.

The VRR smoothing adjustment at any point in time is equal to:

$$\sum_{j=k+1}^{t} n_j *(TUV_j - UV_j)$$

For additional deposits to a smoothed account, the TUV needs to be adjusted to preserve the dollar amount of the pre-deposit VRR enhancement. Consider the deposit of m units into a smoothed account with n units of value, UV, and a target unit value of TUV. The new TUV is then determined by:

$$TUV_{new}=(n*TUV+m*UV)/(n+m)$$

Transfers are permitted between the smoothed accounts, and between the smoothed and unsmoothed accounts. Transfers will be treated such that the VRR smoothing adjustment is preserved if the transfer is between two smoothed accounts. Transfers from a smoothed account to an unsmoothed account will not preserve the VRR smoothing adjustment.

Example 1

Consider the transfer of all funds from smoothed Fund 1 to smoothed Fund 2. The TUV for Fund 2 must be defined to preserve the pre-transfer VRR smoothing adjustment.

$$TUV_2=(UV_2*TUV_1)/UV_1$$

Subsequent calculations of $TUV_2$ will be performed according to Formula 1 if it is a new sub-account with no unit value history, or Formula 2 if there is a unit value history established.

Example 2

Consider the transfer of m units from Fund 1 to Fund 2, where both are smoothed. The TUV for Fund 2 will be adjusted to preserve the pre-transfer VRR enhancement. There is no spurious gain or loss:

$$TUV_{2\,new}=(m*TUV_1+n_2*TUV_2)/(n_2+m*UV_1/UV_2)$$

The transfer of funds from an unsmoothed account to a smoothed account will be treated like a new deposit into the smoothed account.

With continued reference to block 126 of FIG. 2, the daily cycle is performed and calculations in accordance with the formulae referenced above are made by calculation engine 12 for all cases and all policies in the system. As indicated above, an additional calculation is made on the "monthaversary" in policy years 2 plus. In the flow chart of FIG. 2, this additional calculation is illustrated by blocks 128, 130 and 132. This calculation determines the target unit value for the current month. As indicated above, such values are equal to the maximum of the target unit value for the previous month times a crediting rate (which provides a floor below which target unit values cannot decrease) and a moving average of preceding unit values. In this preferred embodiment, monthly unit values for the previous 12 months are averaged.

After calculation engine 12 performs the daily and, if appropriate, monthly calculations, the subject method and system proceeds in accordance with block 134 to create reports, data feeds, and data storage, as appropriate. As part of the calculations, the cash surrender values of the smoothed subaccounts and the alternative cash surrender value of the account (VRR CSV) are calculated. These quantities are stored and reported, appropriately. Output based upon these calculations may be forwarded to the insurance company (if the operations are performed by a third party) and/or its distributors or brokers. This operation is represented in the flow chart of FIG. 2 by block 136. The administration system also produces confirmations of transactions, which are then distributed to individuals or entities responsible for initiating the transactions. These operations are represented in FIG. 2 by block 138. Daily transactional logs are updated and support requests are generated, as needed (block 140). Special reports requested by customers or brokers are created by data warehouse reporting system 30 and report writer 34. This operation is represented in FIG. 2 by block 142. Illustration system and data base 36/38 of FIG. 1 are updated with current unit value and rate information (block 144). Similarly, internet transaction manager and data base 26/24 are updated (block 146). Data warehouse reporting system 30 is also updated in this operation, and data warehouse reporting system reports are built, as indicated in block 148. The previous (i.e., just performed) daily cycle is terminated and regular daily backups are performed, as needed (block 150 and 152).

Figure 4:
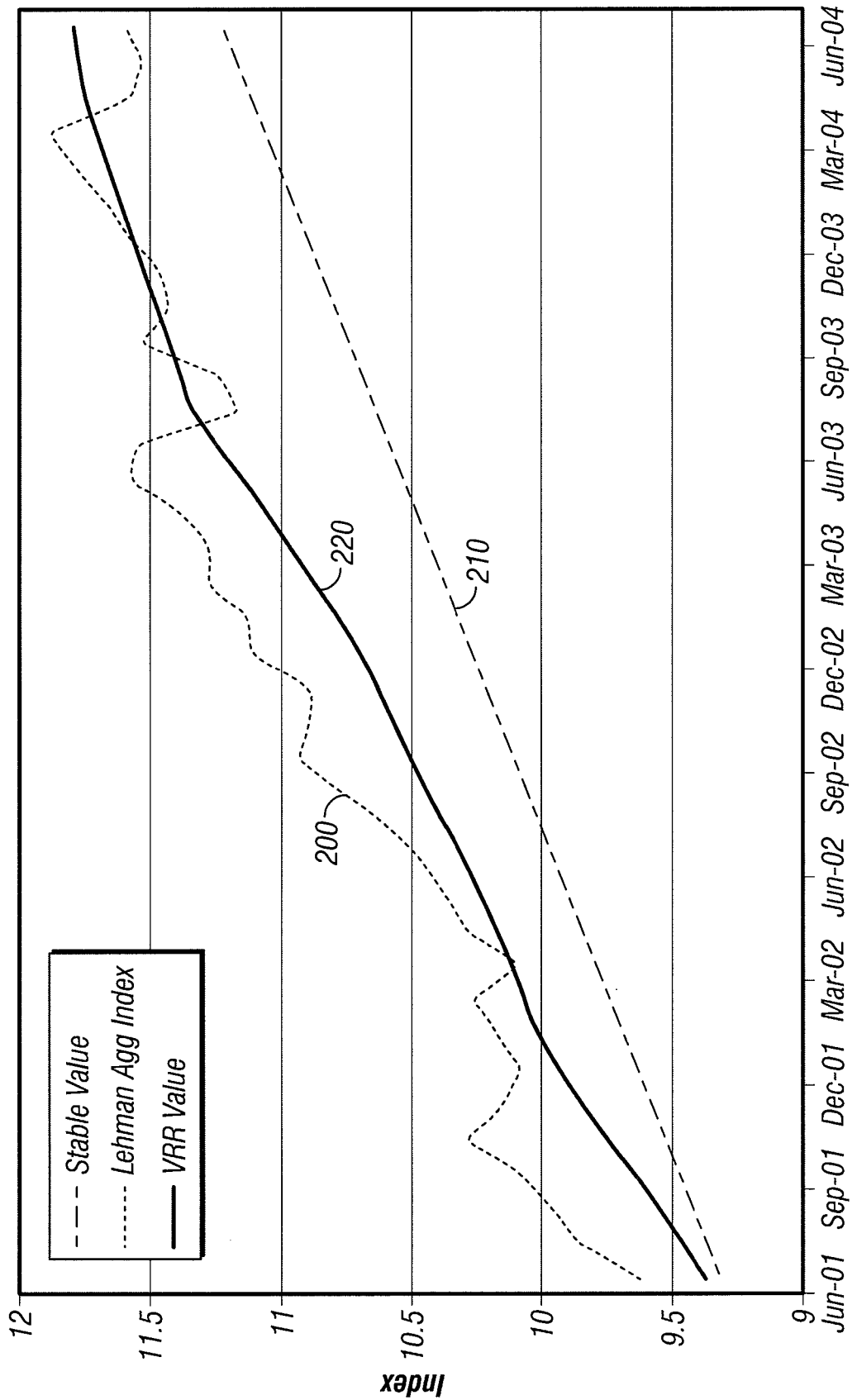
FIG. 4 shows a graph which illustrates smoothed and unsmoothed values of an illustrative market index.

FIG. 4 shows a graph which illustrates the operation of the smoothing mechanism of the present invention. The graph of FIG. 4 further illustrates the difference apparent in the operation of this mechanism and the prior art mechanism which utilizes a Stable Value wrap contract. With reference to FIG. 4, dashed line 200 represents the actual value of a market index (in this example, the Lehman Aggregate Index) for a three year period beginning in June 2001, and ending in June 2004. Broken line 210 represents the Stable Value wrap contract values of an account containing investments varying in accordance with dashed line 200. Solid line 220 represents the comparable VRR values calculated in accordance with the methods and systems described above. As is illustrated by the graph of FIG. 4, the VRR smoothing mechanism more closely follows the actual value of the index (i.e., converges more quickly) than does the Stable Value mechanism. In this example, the volatility of the actual value is substantially reduced, but by a lesser degree than is the case with the Stable Value mechanism.

Although the present invention has been described with reference to particular means, methods and embodiments, one skilled in the art of financial products can ascertain the essential characteristics of the invention from the foregoing description and various changes and modifications may be made to adapt the invention to various uses, without departing from the spirit and scope of the present invention as defined by the following claims.

What is claimed is:

1. A computer-implemented method for use with a computer of the type used to administer a variable universal life insurance product having a volatility reduction feature, said computer having a memory for storing data relating to a life insurance policy and a calculation engine for performing calculations necessary to the administration of a life insurance policy, comprising the steps of:
   a. providing a life insurance policy having a cash surrender value; and using the computer:
   b. creating a plurality of variable subaccounts associated with said policy, at least one of said subaccounts being an unsmoothed variable subaccount and at least one other of said subaccounts being a smoothed variable subaccount;
   c. for each unsmoothed variable subaccount;
      1. storing a number of variable accumulation units associated with said subaccount in the memory;
      2. storing a variable accumulation unit value associated with said subaccount in the memory; and
      3. using the calculation engine, periodically determining an account value of said subaccount by multiplying the number of variable accumulation units by the variable accumulation unit value;
   d. for each smoothed variable subaccount;
      1. storing a number of variable accumulation units associated with said subaccount in the memory;
      2. storing a plurality of variable accumulation unit values associated with said subaccount in the memory; and
   using the calculation engine;
      3. calculating an average of stored variable accumulation unit values, and using said average to determine a target unit value; and
      4. periodically determining a surrender value of said subaccount by multiplying the number of variable accumulation units by the target unit value; and
   e. using the calculation engine and the account value of the unsmoothed variable subaccount and the surrender value of the smoothed variable subaccount, periodically determining the cash surrender value of the insurance policy.

2. The computer-implemented method of claim 1, wherein the target unit value for said smoothed variable subaccount is determined by the calculation engine in an initial policy period by multiplying a previously determined target unit value by a rate factor.

3. The computer-implemented method of claim 2, wherein the rate factor is based on a projected annual return for the subaccount, and the initial policy period is one year.

4. The computer-implemented method of claim 1, wherein the target unit value of said smoothed variable subaccount is determined by the calculation engine in a policy period subsequent to an initial policy period by taking the greater of:
   a. the target unit value for a previous period multiplied by first rate factor; and
   b. the average of previously stored variable accumulation unit values multiplied by a second rate factor.

5. The computer-implemented method of claim 4, wherein said first rate factor provides a minimum rate of increase of the target unit value, and wherein the second rate factor is a moving average adjustment rate.

6. The computer-implemented method of claim 1, wherein the target unit value for said smoothed variable subaccount is determined by the calculation engine in a policy period subsequent to an initial policy period, for any day between a specified day in a previous period and a specified day in a current period, by multiplying the target unit value determined for the specified day in the previous period by the target unit value determined for the specified day in the current period divided by the target unit value determined for the specified date in the previous period raised to the exponent X, where X is equal to the number of days since the specified day in the previous period divided by the number of days between the specified day in the previous period and the specified day in the current period.

7. The computer-implemented method of claim 1, wherein the target unit value for said smoothed variable subaccount is determined by the calculation engine:
   a. for any valuation day in an initial policy period, by multiplying the target unit value determined on a previous day by a rate factor;
   b. for a specified day in a current month of a policy period after the initial policy period, by taking the greater of a target unit value determined for a specified day of a previous month multiplied by a rate factor, and the average of previously stored variable accumulation unit values multiplied by a rate factor; and
   c. for any day between the specified day in the previous month and the specified day in the current month of a policy period after the initial policy period, by multiplying the target unit value determined for the specified day of the previous month by the target unit value determined for the specified day of the current month divided by the target unit value determined for the specified day of the previous month raised to the exponent X, where X is equal to the number of days since the specified day in the previous period divided by the number of days between the specified day in the previous period and the specified day in the current period.

8. The computer-implemented method of claim 1, wherein said step of creating a plurality of subaccounts further comprises creating at least one fixed subaccount.

9. The computer-implemented method of claim 8, further comprising the step of periodically determining an account value of said fixed subaccount, and wherein said step of periodically determining the cash surrender value of the insurance policy is performed by the calculation engine using said account value.

10. The computer-implemented method of claim 1, further comprising the step of providing a loan feature to an owner of the life insurance policy, and wherein said step of periodically determining the cash surrender value of the insurance policy using the calculation engine includes accounting for indebtedness under the loan feature.

11. A computer-implemented method for use with a computer of the type used to administer of a variable universal life insurance product having a volatility reduction feature, said computer having a memory for storing data relating to a life insurance policy and a calculation engine for performing calculations necessary to the administration of a life insurance policy, comprising the steps of:
   a. providing a life insurance policy having a cash surrender value; and using the computer:
   b. creating at least one subaccount associated with said life insurance policy;
   c. storing a number of variable accumulation units associated with said subaccount in the memory;
   d. storing a plurality of variable accumulation unit values associated with said subaccount in the memory; and
using the calculation engine:
   e. calculating an average of stored variable accumulation unit values, and using said average to determine a target unit value;
   f. periodically determining a surrender value of said subaccount by multiplying the number of variable accumulation units by the target unit value; and
   g. using the surrender value of the subaccount, periodically determining the cash surrender value of the insurance policy.

12. The computer-implemented method of claim 11, wherein the target unit value for said subaccount is determined by the calculation engine in an initial policy period by multiplying a previously determined target unit value by a rate factor.

13. The computer-implemented method of claim 12, wherein the rate factor is based on a projected annual return for the subaccount, and the initial policy period is one year.

14. The computer-implemented method of claim 11, wherein the target unit value of the subaccount is determined by the calculation engine in a policy period subsequent to an initial policy period by taking the greater of:
   a. the target unit value for a previous period multiplied by first rate factor; and
   b. the average of previously stored variable accumulation unit values multiplied by a second rate factor.

15. The computer-implemented method of claim 14, wherein said first rate factor provides a minimum rate of increase of the target unit value, and wherein the second rate factor is a moving average adjustment rate.

16. The computer-implemented method of claim 11, wherein the target unit value for said subaccount is determined by the calculation engine in a policy period subsequent to an initial policy period, for any day between a specified day in a previous period and a specified day in a current period, by multiplying the target unit value determined for the specified day in the previous period by the target unit value determined for the specified day in the current period divided by the target unit value determined for the specified date in the previous period raised to the exponent X, where X is equal to the number of days since the specified day in the previous period divided by the number of days between the specified day in the previous period and the specified day in the current period.

17. The computer-implemented method of claim 11, wherein the target unit value for said subaccount is determined by the calculation engine:
   a. for any valuation day in an initial policy period, by multiplying the target unit value determined on a previous day by a rate factor;
   b. for a specified day in a current month of a policy period after the initial policy period, by taking the greater of a target unit value determined for a specified day of a previous month multiplied by a rate factor, and the average of previously stored variable accumulation unit values multiplied by a rate factor; and
   c. for any day between the specified day in the previous month and the specified day in the current month of a policy period after the initial policy period, by multiplying the target unit value determined for the specified day of the previous month by the target unit value determined for the specified day of the current month divided by the target unit value determined for the specified day of the previous month raised to the exponent X, where X is equal to the number of days since the specified day in the previous period divided by the number of days between the specified day in the previous period and the specified day in the current period.

18. A data processing system for administering a variable universal life insurance product having a cash surrender value and a volatility reduction feature, comprising:
   a. a memory for storing data relating to a life insurance policy, said memory being configured to store data relating to a plurality of subaccounts, at least one of which is a smoothed subaccount, said data including a number of variable accumulation units and a plurality of variable accumulation unit values associated with said smoothed subaccount; and
   b. a calculation engine capable of performing calculations necessary to the administration of variable universal life insurance products, said calculation engine being configured:
      1. for calculating an average of stored variable accumulation unit values;
      2. for using said average to determine a target unit value;
      3. for periodically calculating a surrender value of the subaccount by multiplying the number of variable accumulation units by the target unit value; and
      4. for periodically determining the cash surrender value of the insurance policy.

19. The data processing system of claim 18, wherein said calculation engine is configured to determine the target unit value of the subaccount in a policy period subsequent to an initial policy period by taking the greater of:
   a. the target unit value for a previous period multiplied by a first rate factor; and
   b. the average of previously stored variable accumulation unit values multiplied by a second rate factor.

20. The data processing system of claim 19, wherein said first rate factor provides a minimum rate of increase of the target unit value, and wherein the second rate factor is a moving average adjustment rate.

21. The data processing system of claim 18, wherein said calculation engine is configured to determine the target unit value for said subaccount in a policy period subsequent to an initial policy period, for any day between a specified day in a previous period and a specified day in a current period, by multiplying the target unit value determined for the specified day in the previous period by the target unit value determined for the specified day in the current period divided by the target unit value determined for the specified date in the previous period raised to the exponent X, where X is equal to the number of days since the specified day in the previous period divided by the number of days between the specified day in the previous period and the specified day in the current period.

22. The data processing system of claim 18, wherein said calculation engine is configured to determine the target unit value for said subaccount:
   a. for any valuation day in an initial policy period, by multiplying the target unit value determined on a previous day by a rate factor;
   b. for a specified day in a current month of a policy period after the initial policy period, by taking the greater of a target unit value determined for a specified day of a previous month multiplied by a rate factor, and the average of previously stored variable accumulation unit values multiplied by a rate factor; and
   c. for any day between the specified day in the previous month and the specified day in the current month of a policy period after the initial policy period, by multiplying the target unit value determined for the specified day of the previous month by the target unit value determined for the specified day of the current month divided by the target unit value determined for the specified day of the previous month raised to the exponent X, where X is equal to the number of days since the specified day in the previous period divided by the number of days between the specified day in the previous period and the specified day in the current period.

23. A computer-implemented method for use with a computer of the type used to administer a financial product having a volatility reduction feature, said computer having a memory for storing data relating to a life insurance policy and a calculation engine for performing calculations necessary to the administration of a life insurance policy, comprising the steps of:
   a. providing a financial product having a smoothed cash value, said investment product comprising a plurality of investment funds; and using the computer:
   b. storing a number of accumulation units associated with each investment fund in the memory;
   c. storing accumulation unit values associated with each investment fund in the memory; and using the calculation engine:
   d. calculating an account value of the product by summing across the funds, the number of accumulation units multiplied by accumulation unit values;
   e. establishing an initial product unit value;
   f. determining an initial number of product units by dividing the account value of the product by the product unit value;
   g. periodically determining a subsequent product unit value by multiplying the previous product unit value by one plus the growth rate in the account value;
   h. periodically determining a smoothed unit value by calculating a moving average of the product unit value and one or more previously-determined product unit values; and
   i. periodically determining the smoothed cash value of the financial product by multiplying the number of product units by the smoothed unit value.

24. The data processing system of claim 18, wherein said calculation engine is configured to determine the target unit value for said subaccount in an initial policy period by multiplying a previously determined target unit value by a rate factor.

* * * * *